United States Patent [19]

Raghunath et al.

[11] Patent Number: 5,654,025

[45] Date of Patent: Aug. 5, 1997

[54] ULTRAFILTRATION OF COOLED MILK

[76] Inventors: Bala Raghunath, 1430 22nd Ave., So., Apt. #3; David C. Hibbard, 3998 Wood Ridge Trace, both of Wisconsin Rapids, Wis. 54494

[21] Appl. No.: 550,406

[22] Filed: Oct. 30, 1995

[51] Int. Cl.$^6$ ....................................... A23C 7/04
[52] U.S. Cl. ............... 426/491; 426/422; 426/524; 426/580; 210/636; 210/651
[58] Field of Search ........................... 426/580, 491, 426/524, 422; 210/636, 651

[56] References Cited

U.S. PATENT DOCUMENTS

| | | | |
|---|---|---|---|
| 3,707,770 | 1/1973 | Timmins et al. | 99/116 |
| 3,821,108 | 6/1974 | Manjikian | 210/23 |
| 4,205,090 | 5/1980 | Maubois et al. | 426/40 |
| 4,341,801 | 7/1982 | Weissman | 426/491 |
| 4,800,808 | 1/1989 | Lidman | 99/453 |
| 4,897,465 | 1/1990 | Cordle et al. | 530/337 |
| 4,956,186 | 9/1990 | Streiff et al. | 426/491 |
| 5,401,523 | 3/1995 | Degen et al. | 426/580 |

OTHER PUBLICATIONS

On–Farm Ultrafiltration of Milk: Part 1 —Technical Feasibility Studies, A. W. Slack, et al.,Process Biochemistry, Jul./Aug. 1982.
On–Farm Ultrafiltration, Chapter 1, Robert R. Zall, IDF Seminar, Atlanta —USA, Oct., 1985.

Primary Examiner—Helen Pratt

[57] ABSTRACT

A method for concentrating raw milk on farm before transportation to market comprises the steps of cooling the raw milk from the cow to a temperature of less than 45° F. and directing the cooled raw milk through serial membrane separation units while maintaining the temperature to progressively increase the concentration of the raw milk in a single pass and to provide a permeate comprising water and lactose.

17 Claims, 4 Drawing Sheets

ULTRAFILTRATION OF COOLED MILK

FIELD OF THE INVENTION

This invention relates generally to on farm processing of raw milk and, more particularly, pertains to a system and method of producing a milk concentrate suitable for conversion into cultured dairy products such as cheese, yogurt, ice cream and beverage milk.

BACKGROUND OF THE INVENTION

Ultrafiltration is a technique employed in the dairy industry to provide the selective separation, concentration and purification of protein components from a liquid dairy product such as raw milk. The technique comprises the steps of separating the liquid dairy product into a first ultrafiltrate or permeate liquid component by placing the dairy product in contact with a semi-permeable membrane. The first liquid component is the permeate which flows through the semi-permeable membrane. The second liquid component is the concentrate that does not flow through the semi-permeable membrane and which has a higher concentration than the first liquid component.

In practice, the first liquid component or permeate is collected and eventually disposed of on the farm or distributed as feed to livestock. The second liquid component or retentate continues to be separated until a milk concentrate with the desired enriched protein content is obtained. The milk product to be processed in contact with the semi-permeable membrane is placed under pressure and typically subjected to a turbulent flow so as to agitate the liquids adjacent the membrane and enable the obtaining of a higher content of solids in the retained liquid concentrate. Using on-farm ultrafiltration, dairy personnel and processors realize lower hauling costs for the reduced volumes of concentrate which must be transported to dairies, reuse of permeate as feed to livestock, reduction in refrigeration expenditures, and premium component pricing from enhanced value to the processor. In addition, ultrafiltration provides for increased cheese yields, a more consistent and predictable quality cheese and reduced rennet requirement.

In previously known milk processing systems, ultrafiltration has been typically performed in closed loop or recirculatory designs and at high concentration levels and/or at high temperatures (above 120° F.) selected to provide increased yields and maximum membrane flux. The application of heat and pasteurization to control microbial growth has also been advocated with the objective of killing a portion of the bacteria present in milk or the retentate. Unfortunately, several species of bacteria continue to flourish and grow at such high temperatures and in such closed environments. In addition, the ultrafiltration concentrate that has been obtained by processing pasteurized milk is still required to be pasteurized at the destination plant to which it is shipped before it can be used in that destination if the milk and milk products are to retain a grade A certification. It has been discovered by cheese makers, that as milk is subjected to multiple heat treatment, changes may occur in the milk constituents that can result in the production of defective cheese.

Since all macromolecules and microbes are retained in ultrafiltration, there has been heightened concern about the presence of undesirable bacteria, toxins and enzymes. Therefore, it is a general aim of the present invention to provide an ultrafiltration system in which the growth of bacteria is minimal, heat damage to proteins and cheese defects is reduced and the advantages of low level concentration are maximized. It is also desirable to provide a method of processing milk to obtain an acceptable concentrate product which is not pasteurized or homogenized so as to maintain the highest quality of end product produced with the concentrate. It is further desirable to process high quality milk produced on the farm into membrane concentrated lactose reduced raw milk which will meet and exceed grade A standards for whole milk as regulated by the Food and Drug Administration (FDA) and the United States Department of Agriculture (USDA). It is within the purview of this invention to consider an alternative scheme to the prior art closed loop or recirculatory systems in order to avoid the problem of bacteria buildup in the ultrafiltration system during concentration.

It is also important in any membrane process to clean the membranes back to their original permeability so as to maintain maximum performance with respect to permeate flux. Both organic foulants, which are primarily proteins, and mineral foulants abound in milk and can significantly alter membrane permeability. The operating parameters of velocity and pressure must be chosen to minimize fouling and ensure membrane recovery. Likewise, consideration should also be given to minimizing polarization or saturated layers which build up next to the membrane if fluid flows through the membrane faster than the retentate can diffuse into the bulk liquid.

SUMMARY OF THE INVENTION

The invention advantageously provides a method and system for membrane filtering of milk such that the aforementioned problems are eliminated and a desired degree of milk concentration is consistently obtained by a simple apparatus. The invention allows for the preparation of a liquid milk concentrate at points located in the vicinity of places of production of the milk and thus effects appreciable savings, particularly where transportation costs are high. Such an arrangement further enables the processing of milk in a perfect state of freshness, an essential prerequisite for maintaining the quality of cheese subsequently obtained.

In one aspect of the invention, a method for concentrating raw milk on the farm comprises the steps of cooling the milk from the cow to a temperature less than 45° F. and directing the cooled raw milk through serial membrane separation units while maintaining the temperature to progressively increase the concentration of the raw milk in a single pass and to provide a permeate comprising water, lactose and minerals.

In another aspect of the invention relating to a method for treating raw milk delivered from a cow by passing the raw milk through an ultrafiltration arrangement to yield a permeate component that could be used to feed the cow and a concentrate component used to make a cheese product, the improvement comprises cooling the raw milk to a temperature less than 45° F. prior to passing the raw milk through the ultrafiltration arrangement.

In yet another aspect of the invention, a system for producing a milk concentrate by membrane filtration of raw milk produced by a cow on a farm comprises a cooling arrangement for cooling and maintaining the raw milk from the cow to a temperature of less than 45° F. and a serial array of membrane filtration units operatively connected with the cooling arrangement for producing a cooled permeate component used to feed the cow and a cooled concentrate component used to make a cultured dairy product.

In still another aspect of the invention, a system for producing a milk concentrate by membrane filtration of raw milk produced by a cow on a farm and selectively cleaning the membranes with a cleaning fluid comprises a plumbing arrangement for converting the serial array of membrane filtration units to a parallel arrangement in which the cleaning fluid flows in equal volumes through the identical types of membrane filtration units.

BRIEF DESCRIPTION OF THE DRAWINGS

The invention will become better understood by reference to the following detailed description of the preferred exemplary embodiment when read in conjunction with the appended drawing wherein like numerals denote like elements, and.

DETAILED DESCRIPTION OF THE PREFERRED EMBODIMENT

The present invention provides a process for obtaining a specific protein enriched milk concentrate by immediately cooling raw milk delivered from a cow to a temperature less than 45° F. and then passing the cooled raw milk through serial membrane separation units while maintaining the temperature to progressively increase the concentration of milk in a single pass and provide a permeate comprising water, lactose and minerals. At the outset, it should be understood that if the temperature of the milk reaches 45° F. or higher, at any point within the system, the system will be programmed to divert the entire content of milk within the system to a drain.

Figure 1A:
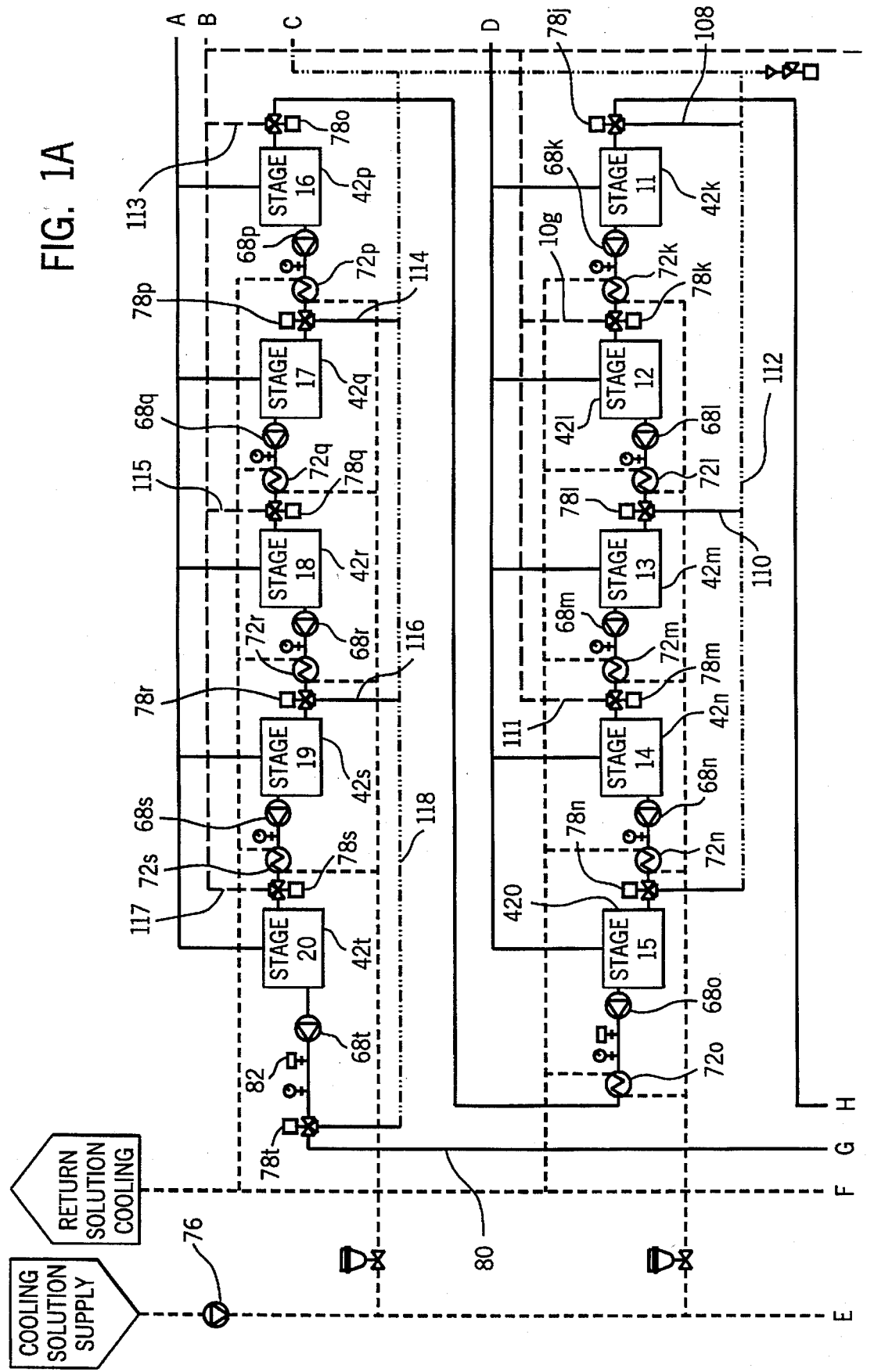
FIGS. 1A, 1B and 1C a schematic diagram of the ultrafiltration process embodying the invention.
Figure 1B:
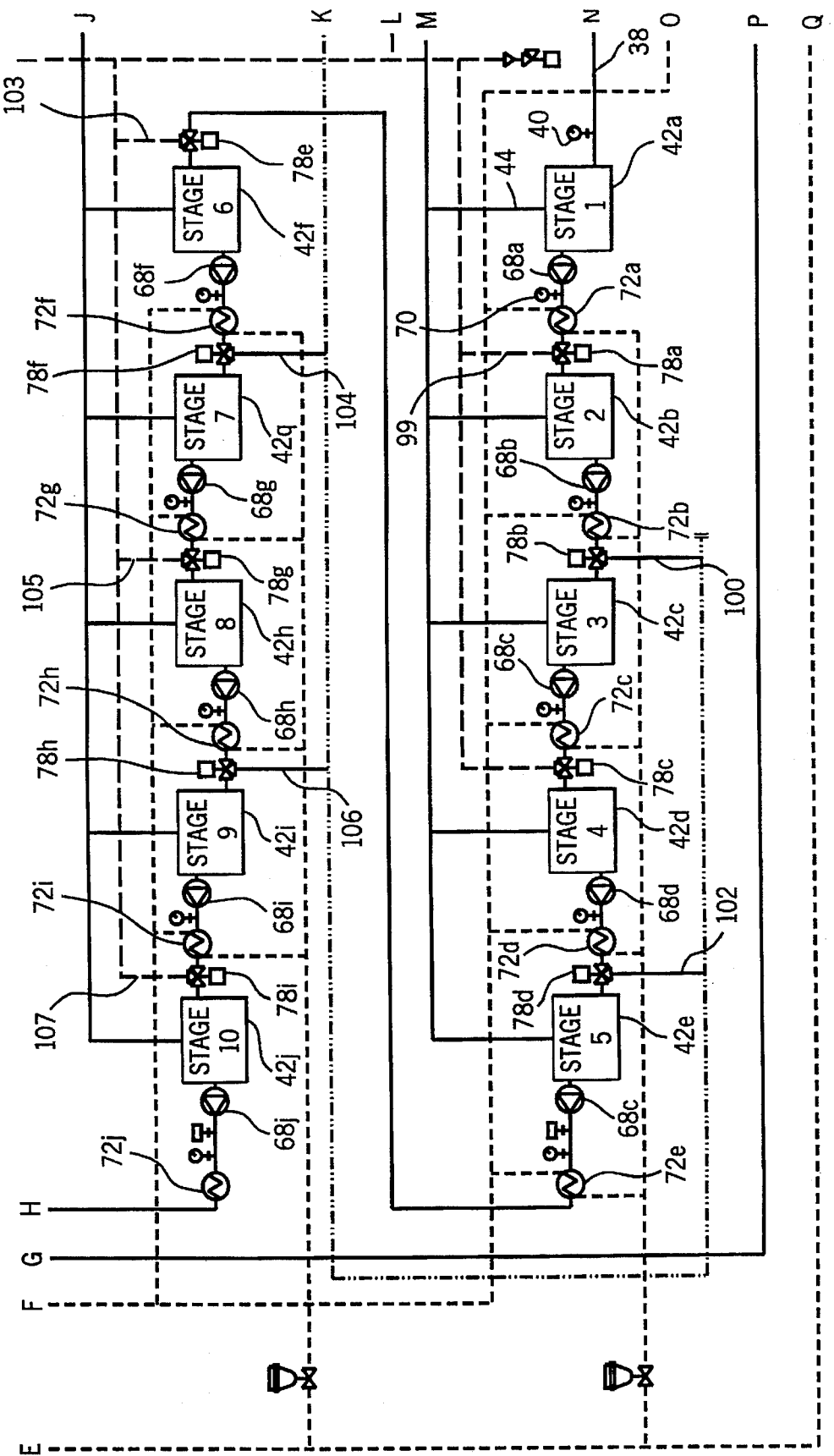
Figure 1C:
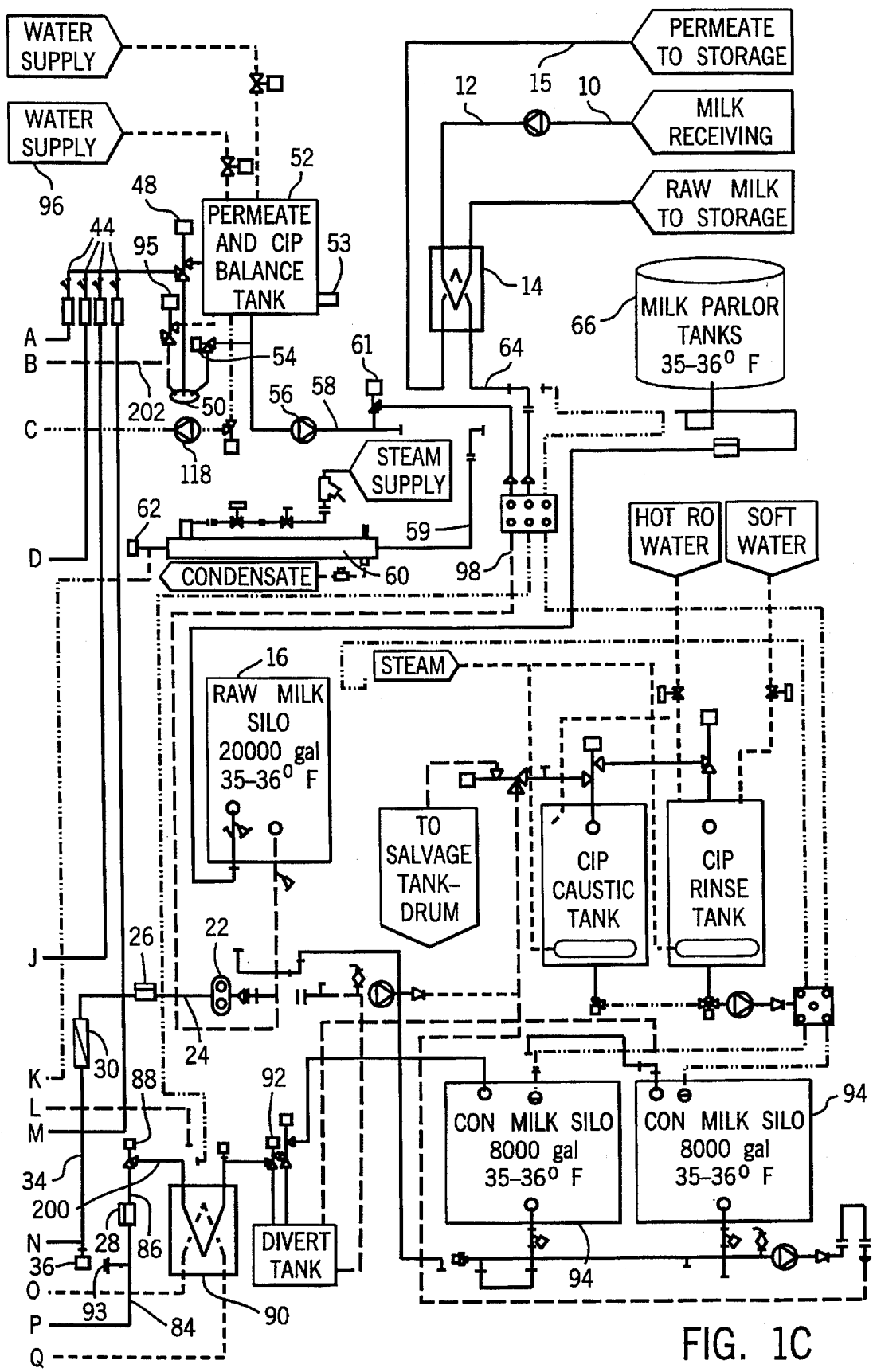

FIGS. 1A, 1B and 1C diagram a schematic of an exemplary system and process cycle according to the present invention. Raw milk delivered from the cow is fed by a centrifugal pump 10 through a line 12 and an array of heat exchangers 14 for instantaneous cooling of the raw milk to a temperature of less than 45° F. (ideally 37° F.) and depositing of the chilled raw milk from line 15 into one or more raw milk tanks 16. Chilled raw milk flows from one of the tanks 16 to the input of a frequency driven, positive displacement pump 22 used to provide pressurized flow with low shear so as not to damage the fat globules in the raw milk. The output of pump 22 is connected by a line 24 to the input of a first magnetic flow device 26 which employs a 4–20 ma electrical signal to control pump 22 and a feed signal to a second magnetic flow device 28 downstream as will be appreciated hereafter. From the output of magnetic flow device 26, the chilled raw milk flows through a filter 30 for the purpose of cleaning out unwanted foreign particles such as cow hair or the like.

From the output of filter 30, the chilled raw milk then flows under the influence of pump 22 through a line 34 and past a temperature sensing device 36. The chilled raw milk continues along line 38 and travels through a pressure sensing device 40 which monitors the incoming pressure of the chilled raw milk as it enters the inlet of a first stage or vessel in a serial array of twenty identical stages or vessels 42a–42t, each typically and similarly comprised of five adjacently positioned filtration membranes. These membranes are typically of the spiral wound species and include a feed spacer to promote turbulence of flow therethrough as is well known in the filtration art. In the preferred embodiment, each membrane is cylindrical in shape and generally measures 38 inches in length and 3.8 inches in diameter, it being understood that various sizes and numbers of membranes and vessels may be employed to yield the flow concentration desired.

Pump 22 propels chilled raw milk into the first vessel 42a at a pressure of approximately 70–120 psi and through each of the membranes which individually fractionates or separates the chilled raw milk into a permeate and a concentrate. The permeate is chiefly comprised of water and lactose with small amounts of minerals, lactic acid and protein. The concentrate includes fat and enriched protein along with some lactose and minerals. The collective permeate which flows freely from the output of the first vessel 42a is deposited in a permeate header 44 connected by a line 46 to a divert valve 48 which sends the permeate either to a drain 50 or into a permeate balance tank 52. As regulated by a level sensor 53 on permeate balance tank 52, permeate is controlled by throttling valve 61, which regulates discharge flow from a centrifugal pump 56 through line 58 to heat exchanger 14. (The shut off drain valve 54 is used to drain the permeate tank if necessary). The cold permeate is used to cool the incoming raw milk before ultimately being delivered through a line 64 to storage. Permeate liquid may then be fed as desired to livestock or otherwise distributed on the surrounding farm.

Concentrate flowing through vessel 42a is subjected to a pressure drop as it flows through each membrane, such pressure drop being dependent upon the type of membranes used and the viscosity of the milk product flowing therethrough. In order to maintain a substantially constant pressure in the system, a centrifugal pump 68 is employed to boost the pressure of the concentrate leaving first vessel 42a back to the 70–120 psi range. Boosted concentrate is monitored by a pressure sensing device 70 and flows through a heat exchanger 72 which is used to prevent any temperature rise of the product. Pump 76 is used for circulating a cooling solution which maintains the concentrate in the system at a temperature less than 45° F., but typically 40√–43° F. Valve 78a allows the concentrate retained in the first stage or vessel 42a to flow into a second stage or vessel 42b in which the incoming fluid is further separated into permeate and concentrate components. Each component traces a similar path through similar control elements as aforedescribed to progressively increase the concentration of raw milk in line 80 of final stage 42t to a predetermined value consistent with the cheese product to be manufactured therefrom. Such concentration is typically in the order of ⅓ to ½ the volume of the raw milk fed into the system. The processed concentrate flows past a temperature sensing device 82 and is fed by a line 84 to the second magnetic flow device 28 which receives signal information from the first magnetic flow device 26 to maintain the flow of the concentrate at an acceptable ratio. The output of magnetic flow device 28 is connected by a line 86 to a throttle valve 88 which normally allows the processed concentrate to flow through a final heat exchanger 90 so that the concentrate is fed by a flow diversion valve 92 into product tanks 94 at a reduced temperature of 35°–36° F. for storage and shipping.

Figure 2:
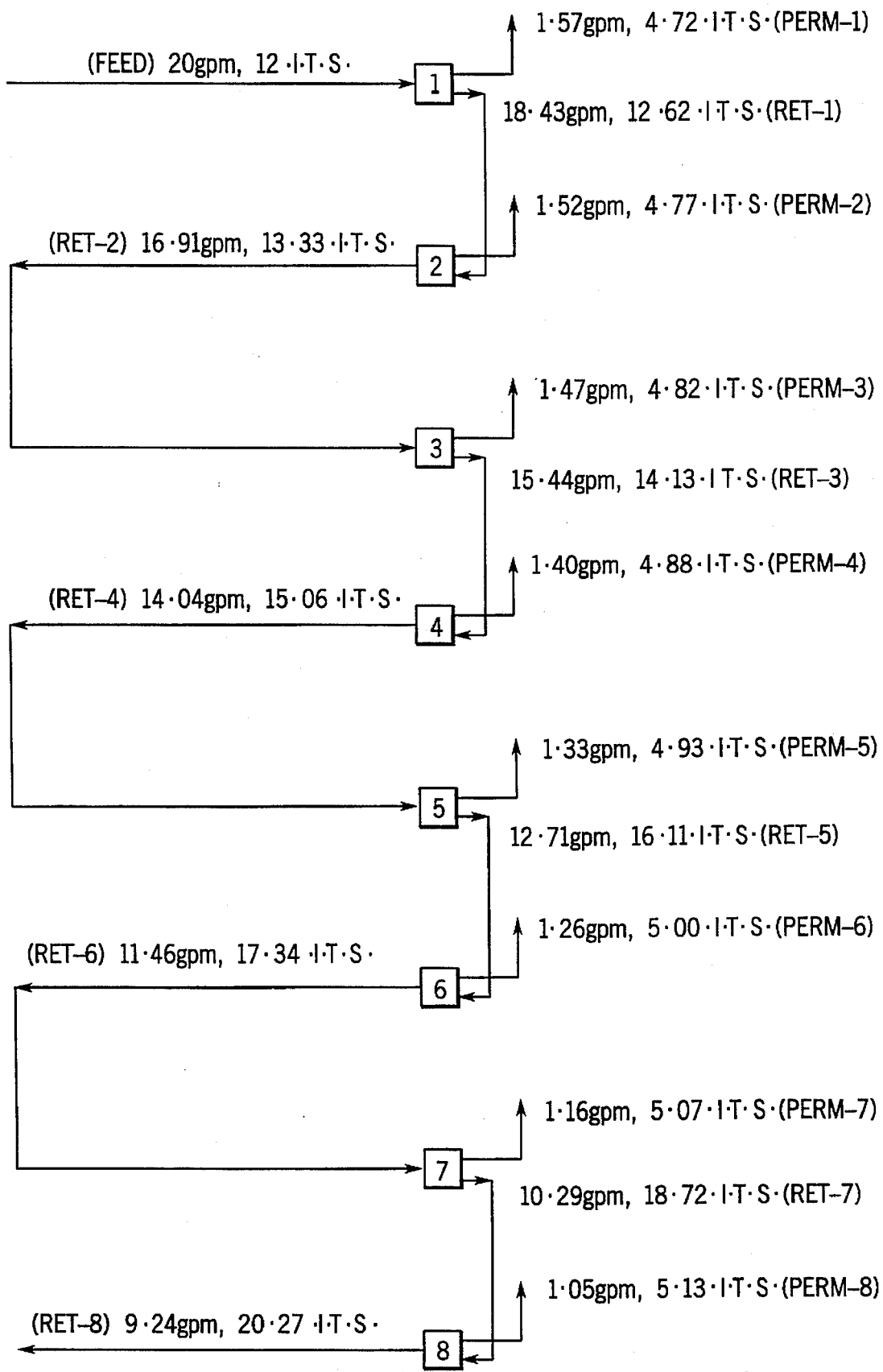
FIG. 2 is an abbreviated schematic diagrams illustrating practical flow rates in an eight stage ultrafiltration system.

FIG. 2 illustrates a typical scheme employing eight distinct stages or vessels in an ultrafiltration process as described above. For simplicity, only the feed, permeate and concentrate flows are indicated to show the relative ranges at which raw milk may be progressively ultrafiltered to reach a desired concentrate of 9.24 gallons per minute from a practical feed rate of 20 gallons per minute. The upwardly directed arrows depict the permeate flow. Each of the flow rates have a corresponding total solids figure associated therewith. It should be mentioned that the viscosity of milk and the type of membranes used dictate that the raw milk should be fed at a maximum of about 25–26 gallons per minute per vessel and a minimum of about 8 gallons per minute per vessel in such an ultrafiltration system to avoid mechanical damage to the membrane or cause fouling. The minimum and maximum flow within a vessel is determined based on observed effects of turbulence necessary to allow processing without severe fouling effects or cause excessive pressure drops.

It should be appreciated that cooling the milk to a temperature of less than 45° F. and maintaining this temperature during processing has been found to be a more effective method of controlling bacterial growth rather than pasteurizing and processing at warm temperatures above 118° F. In the past, ultrafiltration (UF) of milk was not conducted at cold temperatures because of the limitation in membrane performance of the then existing membranes and owing to relatively small size of dairies, the overall economics does not favor the use of membrane processing on farm. However, relatively large (herd size of 1000–3000), modern dairies and the development of the current single pass design to process raw milk at cold temperatures of 45° F. or less have afforded a significant economic incentive for membrane concentration on farm. The above concept prevents bacterial growth, maintains milk quality, preserves grade certification and reduces hauling cost.

It should also be mentioned that the single pass ultrafiltration process of the present invention typically will not process pasteurized milk or will the concentrate be pasteurized because the end user does not want the concentrate heat treated prior to its receipt. Multiple pasteurization has been found to reduce the quality of the milk for manufacturing purposes. In addition, end users will need the option of adding fresh unpasteurized cream, skim or milk to the finished product. The mixing of pasteurized and non-pasteurized milk causes further manufacturing problems and denigrates end product quality. Pasteurization at the UF site can mask quality problems at the farm and thus deprive the end user of the ability to determine quality by checking for curdling and unfavorable odors. Leaving the concentrate intact without further heat processing forces the producer to conform to the highest standards of hygiene, cleaning, sanitation and cooling in order to deliver the highest quality product.

It is important in any membrane process to clean the membranes back to their original permeability so as to maintain maximum performance with respect to the fluid flow. Referring back to FIGS. 1A, 1B and 1C, the ultrafiltration process is advantageously convertible from a series arrangement to a parallel, cleaning in place (CIP) arrangement using recirculatory flow.

At the end of the process cycle, which may last for 16–20 hours, the system is required to receive a cleaning cycle. After the last volume of milk is processed, the system is briefly shut down to make certain piping swing connections before beginning the cleaning cycle. These piping swing connections occur at three locations: line 58 is connected to line 98, line 98 is connected to the positive displacement pump 22 (which isolates the raw milk tanks 16), and line 58 is connected through line 59 to heat exchanger 60.

The first step in the cleaning cycle is the flush cycle, which is followed by a series of alternating rinse and chemical wash cycles. To begin the flush cycle, the operator will select the switch corresponding to the flush cycle on the control panel. The piping swing connections described above make the permeate/CIP tank 52 the supply tank for the system and the permeate is used to flush the product within the system. During the flush cycle, pump 56 is employed to channel one portion of the permeate through line 98 to positive displacement pump 22 which channels the flushing liquid via line 34 at a pressure of about 30–50 psi towards the first vessel 42a. Pump 56 is also utilized to channel another portion of the flushing liquid through line 59 and through heat exchanger 60 to supply header junctions 100, 102, 104 and 106, adjacent vessels 42c, 42e, 42g and 42i. Pump 118 is employed to channel the flushing liquid from tank 52 to supply header junctions 108, 110, 112, 114 and 116, adjacent vessels 42k, 42m, 42o, 42q and 42s. The fluid flow is in the same direction as process flow. The permeate flow path is identical to that followed during process i.e. the permeate is collected by the permeate headers 44 and returned through divert valve 48 to the permeate/CIP tank 52. Cross body valves 78b, 78d, 78f, 78h, 78j, 78l, 78n, 78p, 78r and 78t are programmed to open in a sequential manner to connect the supply headers 100, 102, 104, 106, 108, 110, 112, 114 and 116 to the adjacent vessels described earlier. The flushed product continues to flow through line 80, the magnetic flow device 28, line 86, valve 88 and through the flow diversion valve 92 into the product tanks 94. The flush cycle period is set based on the time required to reduce the product concentration measured at valve 93 to a predetermined valve.

After the flush cycle, the system is again briefly shut down to make a few additional piping swing connections before beginning the rinse step. Line 200 is connected through line 201 (which isolates the product tanks 94) to return header 202 which connects to valve 95. The lobes inside pump 22 are also removed to allow flow through the pump. (This is also a CIP requirement to clean pump 22.) Water is used as a rinsing fluid through water supply 96. Cross-body valves 78a–78t are programmed to remain open in the rinse cycle. The control program automatically selects the rinse cycle after the flush cycle. A tank drain step is typically included before the rinse cycle. Both pumps 56 and 118 are employed during the rinse cycle. Pump 56 channels a portion of the rinse water through line 98 to positive displacement pump 22 via line 34 at a pressure of about 30–50 psi towards the first vessel 42a. The flow out of vessel 42a returns into a return header at junction 99. Pump 56 is also utilized to channel another portion of the rinse water through line 59 and through heat exchanger 60 to supply headers 100, 102, 104 and 106. At each junction, half of the flow is directed to the left and the remaining half is directed to the right. For example, at supply header junction 100, half of the flow is channeled through vessel 42c, pump 68c, heat exchanger 72c and into the return header junction 101. The remaining half of the flow is channeled through heat exchanger 72b, pump 68b and vessel 42b into the return header junction 99. A similar flow distribution occurs at each of the supply header junctions 102, 104 and 106 and return header junctions 99, 103, 105 and 107. Pump 118 is employed to transfer rinse water to supply header junctions 108, 110, 112, 114 and 116. The flow distribution at these junctions is similar to the one described for junction 100. Vessels 42a through 42j (the first 10 vessels) contain membranes that have the same type of feed spacer material, which governs their resistance to flow. Hence, a single pump 56 is used to supply the rinse water for these vessels in order to ensure equal flow distribution. Vessels 42k through 42t contain membranes that have a wider feed spacer material compared to the membranes in vessels 42a through 42j. Hence, pump 118 is used to supply rinse water to these vessels to ensure uniform flow distribution. During rinse, the permeate return line 44 is connected through divert valve 48 to drain 50. All of the return header junctions 101, 103, 105, 107, 109, 111, 113, 115 and 117 connect to the return header 202 and through divert valve 95 to drain 50. The rinse cycle typically lasts for 3–5 minutes.

After the first rinse is complete, the first chemical wash cycle is begun. During the chemical wash cycle, the feed supply and return flow distribution within the vessels is identical to what is obtained during rinse; but valves 48 and 95 are configured to return the solutions to the permeate/CIP balance tank 52. Heat exchanger 60 is used to indirectly heat the solution using steam. Steam supply is controlled using a temperature sensing device 62. When the desired chemical wash cycle temperature (typically between 115° F. –120° F.) is obtained, the steam supply valve is automatically shut off. The chemical wash cycle typically lasts for 20–50 minutes, depending on the type of chemicals used.

Typically, the chemical wash cycles involve separate washings and can be broadly classified into two types:
 (i) Caustic Wash: Comprises a combination of caustic, surfactant and/or chlorine at a pH range of 11–11.6;
 (ii) Acid Wash: Uses a built-in phosphoric/acid chemical and is carried out at a pH of 2.0–2.2. Citric acid may also be used sometimes.

At the end of the chemical wash cycle, the permeate/CIP tank 52 is drained and the system is subjected to additional sequences of rinse/chemical wash cycles. After the final wash cycle, a sanitizing soak cycle, which is operationally similar to the chemical wash cycle, is carried out. The system is shut down with the soak solution remaining inside until the beginning of the next process cycle.

While the invention has been described with reference to a preferred embodiment, those skilled in the art will appreciate that certain substitutions, alterations and omissions may be made without departing from the spirit thereof. For example, it should be understood that varying concentration levels can be obtained by altering the type and number of vessels and/or types of membranes in the system. Furthermore, reducing the volume or going to a higher concentration factor using the system above described is contemplated within the purview of the invention. Accordingly, the foregoing description is meant to be exemplary only, and should not be deemed limitative on the scope of the invention set forth with the following claims.

We claim:

1. A method for concentrating raw milk from a cow before transportation to market comprising the steps of:
 cooling the milk from the cow to a temperature less than 45° F.; and
 directing the cooled raw milk through a plurality of membrane separation units in series while maintaining said temperature to progressively increase the concentration of the raw milk in a continuous single pass such that milk exiting each one of said membrane separation units does not contact the milk feeding said one of said membrane separation units, and to provide a permeate comprising water and lactose.

2. The method of claim 1, including the step of providing a milk concentrate having a volume ⅓ to ½ the volume of the raw milk.

3. The method of claim 2, including the step of further cooling said milk concentrate to a temperature of substantially 35° F.

4. The method of claim 1, including the step of maintaining a substantially constant pressure range in said system.

5. The method of claim 1, including the step of using cooled permeate to cool said raw milk.

6. The method of claim 1, including the step of converting said serial membrane separation units to a parallel configuration in which a cleaning fluid flows in equal volume to each of said membrane filtration units.

7. In a method for treating raw milk delivered from a cow by passing said raw milk through an ultrafiltration arrangement having a plurality of serially connected membrane filtration units to yield a permeate component used to feed the cow and a concentrate component used to make a cheese product, the improvement comprising:
 cooling said raw milk from the cow to less than 45° F. prior to continuously single passing said raw milk through said ultrafiltration arrangement; and
 providing a pumping device at the outlet of each of said membrane filtration units to overcome pressure drop resulting from flow through said membrane filtration units.

8. In a system for producing a milk concentrate by membrane filtration of the raw milk produced by a cow, the system comprising:
 cooling means for cooling and maintaining the raw milk from the cow to a temperature of less than 45° F.; and
 a serial array of membrane filtration means operatively connected with said cooling means for producing a cooled permeate component used to feed the cow and a cooled concentrate component used to make a cultured dairy product, each of said membrane filtration means being constructed and arranged such that milk exiting each one of said membrane filtration means does not contact milk feeding said one of said membrane filtration means.

9. The system of claim 8, including pumping means connected with said membrane filtration means to maintain a substantially constant pressure range in the system.

10. The system of claim 8, wherein said membrane filtration means comprises at least spiral wound membrane.

11. The system of claim 8, including further cooling means for cooling said concentrate to a temperature of approximately 35° F.

12. The system of claim 8, wherein said cooled permeate component is adapted to cool the raw milk from the cow.

13. The system of claim 8, including a booster pumping means associated with said membrane filtration means.

14. The system of claim 8, including permeate balance tank means for selectively collecting permeate and cleaning fluid therein.

15. A system for producing a milk concentrate by membrane filtration of the raw milk produced by a cow, and selectively cleaning the membranes with a cleaning fluid, the system comprising:
 cooling means for cooling and maintaining the raw milk from the cow to a temperature of less than 45° F.;
 a serial array of membrane filtration means operatively connected with said cooling means for producing a cooled permeate component used to feed the cow and a cooled concentrate component used to make a cultured dairy product; and
 plumbing means for converting said serial array of membrane filtration means to a parallel arrangement in which the cleaning fluid flows in equal volumes through said membrane filtration means;
 said system employing single pass processing of the raw milk through said membrane filtration units and recirculating flow cleaning using said plumbing means.

16. The system of claim 15, wherein said plumbing means includes divert valve means for controlling the flow of the cleaning fluid to said membrane filtration means.

17. The system of claim 15, including heat exchanger means for heating the cleaning fluid to a range of substantially 115°–125° F.

* * * * *